United States Patent [19]

Takeda et al.

[11] Patent Number: 5,382,045
[45] Date of Patent: Jan. 17, 1995

[54] SUSPENSION CONTROL SYSTEM FOR AUTOMOTIVE VEHICLE UTILIZING VARIABLE DAMPING FORCE SHOCK ABSORBER

[75] Inventors: Masayoshi Takeda, Oobu; Takayuki Nagai, Nagoya; Toshiyasu Sahashi, Okazaki, all of Japan

[73] Assignee: Nippondenso Co., Ltd., Kariyai, Japan

[21] Appl. No.: 122,161

[22] Filed: Sep. 17, 1993

[30] Foreign Application Priority Data

Sep. 18, 1992 [JP] Japan ................. 4-275261

[51] Int. Cl.⁶ ................................. B60G 17/015
[52] U.S. Cl. ................... 280/707; 364/424.05
[58] Field of Search ............ 280/707; 364/424.05

[56] References Cited

U.S. PATENT DOCUMENTS

| | | | |
|---|---|---|---|
| 4,696,489 | 9/1987 | Fujishiro et al. | 280/707 |
| 4,838,574 | 6/1989 | Baraszu | 280/707 |
| 4,916,632 | 4/1990 | Doi et al. | 280/707 |
| 5,020,781 | 6/1991 | Huang | 280/707 |
| 5,088,760 | 2/1992 | Kakizaki et al. | 280/707 |

FOREIGN PATENT DOCUMENTS 3104726 5/1991 Japan.

*Primary Examiner*—Eric D. Culbreth
*Assistant Examiner*—Peter C. English
*Attorney, Agent, or Firm*—Cushman, Darby & Cushman

[57] ABSTRACT

A suspension control system for an automotive vehicle is provided which is operable to control transmission of vibratory energy from a road surface to a vehicle body. This suspension control system includes a variable damping force shock absorber, a vertical speed sensor which detects vertical speed of the vehicle body, a relative displacement speed sensor which detects the relative displacement between the vehicle body and a road wheel, and a damping force control unit which is operable to modify a damping force of the variable damping force shock absorber over a range from preselected maximum to minimum values based on the vertical speed and the relative displacement speed. When the vertical speed and the relative displacement speed are smaller than preselected first and second threshold values respectively during vibratory motion of the vehicle body wherein the vertical speed and the relative displacement speed are in the same phase, the damping force control unit controls the variable damping force shock absorber to produce the damping force of a level smaller than the maximum value by a preselected value.

17 Claims, 14 Drawing Sheets

SUSPENSION CONTROL SYSTEM FOR AUTOMOTIVE VEHICLE UTILIZING VARIABLE DAMPING FORCE SHOCK ABSORBER

BACKGROUND OF THE INVENTION

1. Technical Field

The preent invention relates generally to a suspension control system for an automotive vehicle. More particularly, the invention is directed to a damping force control system for a variable damping force shock absorber which is operable to modify damping characteristics based on vertical speed of a sprung portion of a vehicle and relative displacement speed between the sprung and unsprung portions of the vehicle.

2. Background Art

Japanese Patent First Publication No. 3-104726 discloses a damping force control system using the skyhook theory which is designed to modify a damping force of a shock absorber between maximum and minimum levels in a stepwise fashion based on a vertical speed DX of a sprung portion and a relative displacement speed DY between the sprung and unsprung portions of a vehicle.

The above prior art damping force control system offers the advantage in that a high damping force is established against vibrations of relatively lower frequencies due to gradual changes in road elevation for optimizing vehicle handling, road holding ability, and riding comfort. A drawback is, however, encountered in that a damping force higher than that required (i.e., the maximum level) is provided against vibrations including relatively high frequency components which are often experienced in a city road wherein the vertical speed DX and the relative displacement speed DY represent a relatively small value respectively. This gives an unpleasant feeling to vehicle occupants which is caused by the mechanical shock due to a damping force switching operation of the shock absorber.

For improving firm riding comfort, one method has been proposed which slows damping force switching speed only when a damping force control valve is switched from a closed position to an open position to reduce the damping force switching shock. This method is effective in reducing the damping force switching shock, however, it has suffered from a drawback in that a suitable damping force cannot be provided over a wide range from high to low frequency vibrations.

SUMMARY OF THE INVENTION

It is therefore a principal object of the present invention to avoid the disadvantages of the prior art.

It is another object of the present invention to provide a suspension control system which optimizes a damping force produced by a shock absorber against vibratory energy over a wide range from high to low frequencies.

According to one aspect of the present invention, there is provided a suspension control system for an automotive vehicle operable to control the transmission of vibratory energy from a road surface to a vehicle body. This suspension control system comprises a shock absorber, disposed between the vehicle body and a road wheel, designed to provide a variable damping force, a vibration detecting means for detecting a vibratory condition of the vehicle body in a vertical direction, and a signal setting means for setting a damping force modifying command signal, serving to modify a damping force of the shock absorber, based on a sprung speed of a sprung portion of the vehicle determined based on the vibratory condition detected by the vibration detecting means and a sprung-unsprung relative displacement speed between the sprung and unsprung portions of the vehicle. The signal setting means provides the damping force modifying command signal to produce a damping force which is smaller than a maximum level determined in a preselected relation to the sprung speed and the sprung-unsprung relative displacement speed within first regions defined around the origin in first and third quadrants on a coordinate plane defined by coordinate axes indicative of the sprung speed and the sprung-unsprung relative displacement speed.

According to another aspect of the present invention, there is provided a suspension control system for an automotive vehicle operable to control the transmission of vibratory energy from a road surface to a vehicle body which comprises a shock absorber, disposed between the vehicle body and a road wheel, designed to provide a variable damping force, a vibration detecting means for detecting a vibratory condition of the vehicle body in a vertical direction, and a signal setting means for setting a damping force modifying command signal, serving to modify a damping force of the shock absorber, based on the sprung speed of a sprung portion of the vehicle determined based on the vibratory condition detected by the vibration detecting means and sprung-unsprung relative displacement speed between sprung an unsprung portions of the vehicle. The signal setting means provides the damping force modifying command signal to produce a damping force which represents an intermediate level between maximum and minimum levels determined in a preselected relation to the sprung speed and the sprung-unsprung relative displacement speed within first regions defined around the origin in first and third quadrants on a coordinate plane defined by coordinate axes indicative of the sprung speed and the sprung-unsprung relative displacement speed.

According to a further aspect of the present invention, there is provided a suspension control system for an automative vehicle which comprises a variable damping force shock absorber arranged between a vehicle body and a suspension member supporting a road wheel rotatably, a vertical speed determining means for determining vertical speed of the vehicle body to provide a signal indicative thereof, a relative displacement speed determining means for determining speed of relative displacement between the vehicle body and the suspension member to provide a signal indicative thereof, and a damping force control means, responsive to the signals from the vertical speed determining means and the relative displacement means, for modifying a damping force of the variable damping force shock absorber over a range from preselected maximum to minimum levels based on the vertical speed of the vehicle body and the relative displacement speed between the vehicle body and the suspension member. When the vertical speed and the relative displacement speed are smaller than preselected first and second threshold values respectively during vibratory motion of the vehicle body wherein the vertical speed and the relative displacement speed represent the same phase, the damping force control means controls the variable damping force shock absorber to produce a damping force of a preselected level variable between the maximum level and the minimum level in a given relation to the vertical speed and the relative displacement speed.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
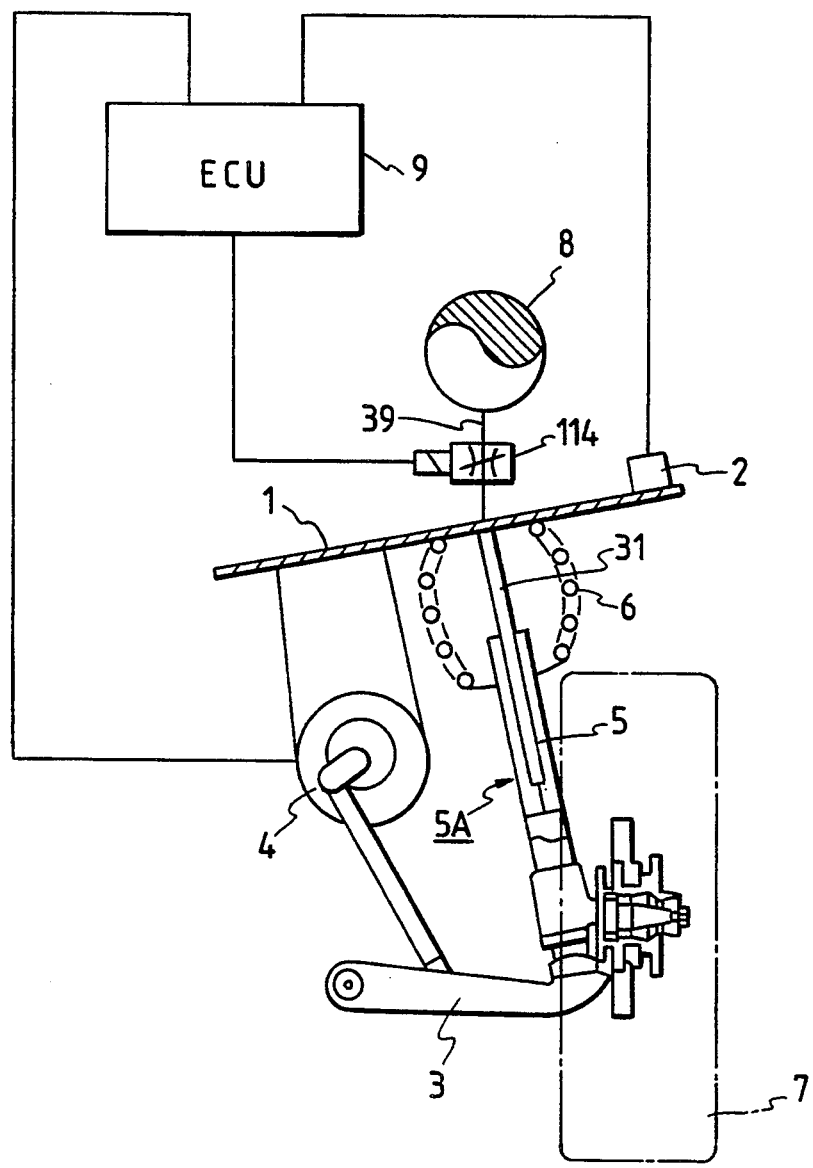
FIG. 1 is a diagram which shows a suspension control system for an automotive vehicle utilizing a variable damping force shock absorber according to the present invention.

Referring now to the drawings, particularly to FIG. 1, there is shown a suspension control system for an automotive vehicle which is applied to a strut type suspension system.

The suspension control system includes generally a variable damping force shock absorber 5A which is designed to actively modify a damping coefficient to restrict transmission of vibratory energy between a vehicle body 1 (i.e., a sprung member) and a suspension member 3 (i.e., an unsprung member) rotatably supporting a road wheel 7. A coil spring 6 is arranged to cushion the shock transmitted from a road surface during traveling.

Figure 3:
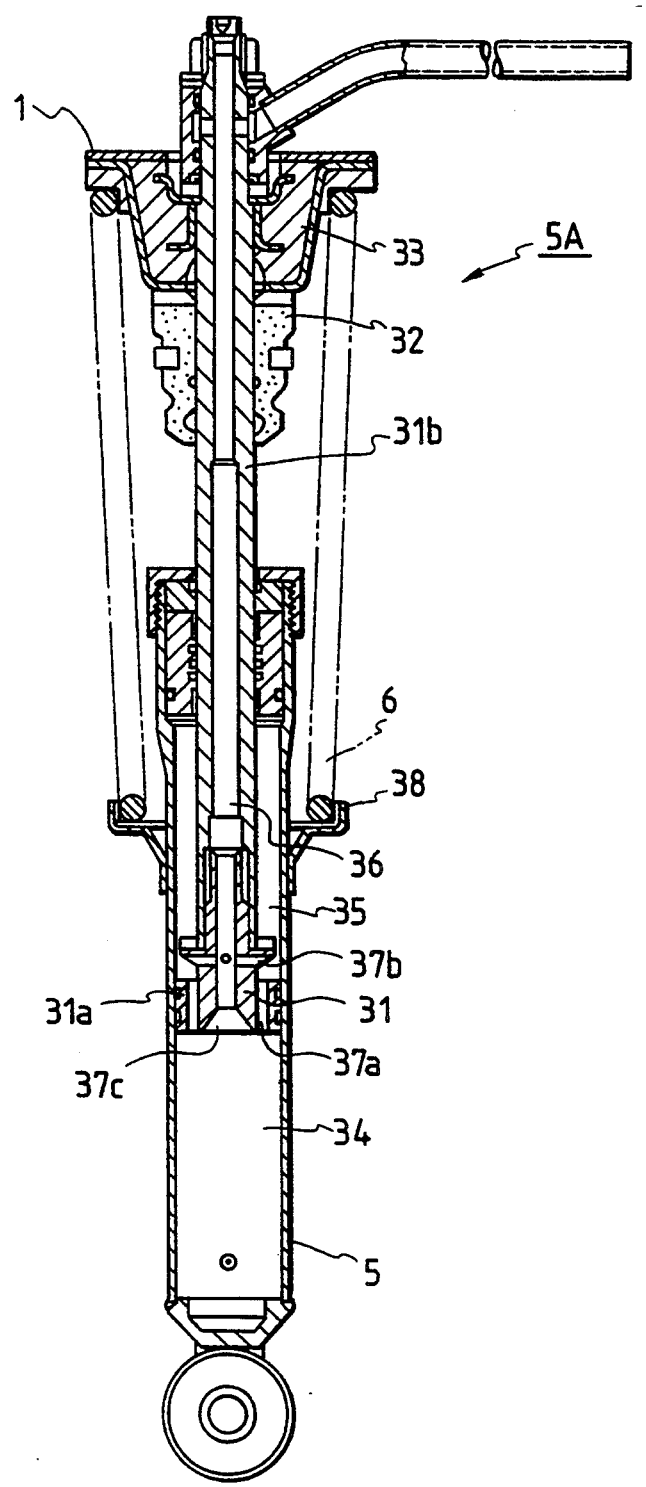
FIG. 3 is a sectional view which shows a structure of a variable damping force shock absorber utilized in a suspension control system.

Referring to FIG. 3, a cross-sectional structure of the variable damping force shock absorber 5A is shown.

The shock absorber 5A includes generally a cylinder 5 and a piston 31. The coil spring 6 is disposed between an upper support 33 fixed to a lower surface of the vehicle body 1 and a spring seat 38 mounted on the cylinder 5. The piston 31 includes a piston rod 31b which is supported by the upper support 33 and a cushion damper 32.

The piston includes a piston body 31a mounted on the lower end of the piston rod 31b. The piston body 31a is slidably disposed in the cylinder 5. The piston body 31a defines in the cylinder 5 an upper chamber 35 and a lower chamber 34 which communicate with each other through a communication port 37a extending through the piston body 31a. The sliding motion of the piston body 31a in the cylinder causes a working fluid (e.g., hydraulic fluid, or oil) to flow between the upper chamber 35 and the lower chamber 34 via the communication port 37a.

A fluid passage 36 extends in the piston 31 which opens into the lower chamber 34 through a communication port 37c formed in the piston body 31a. The fluid passage 36 also communicates with the upper chamber 35 through a communication port 37b provided in the piston rod 31b. As shown in FIG. 1, the fluid passage 36 leads to an accumulator 8 through a variable throttle valve (i.e., a variable restrictor) 114.

Figure 4:
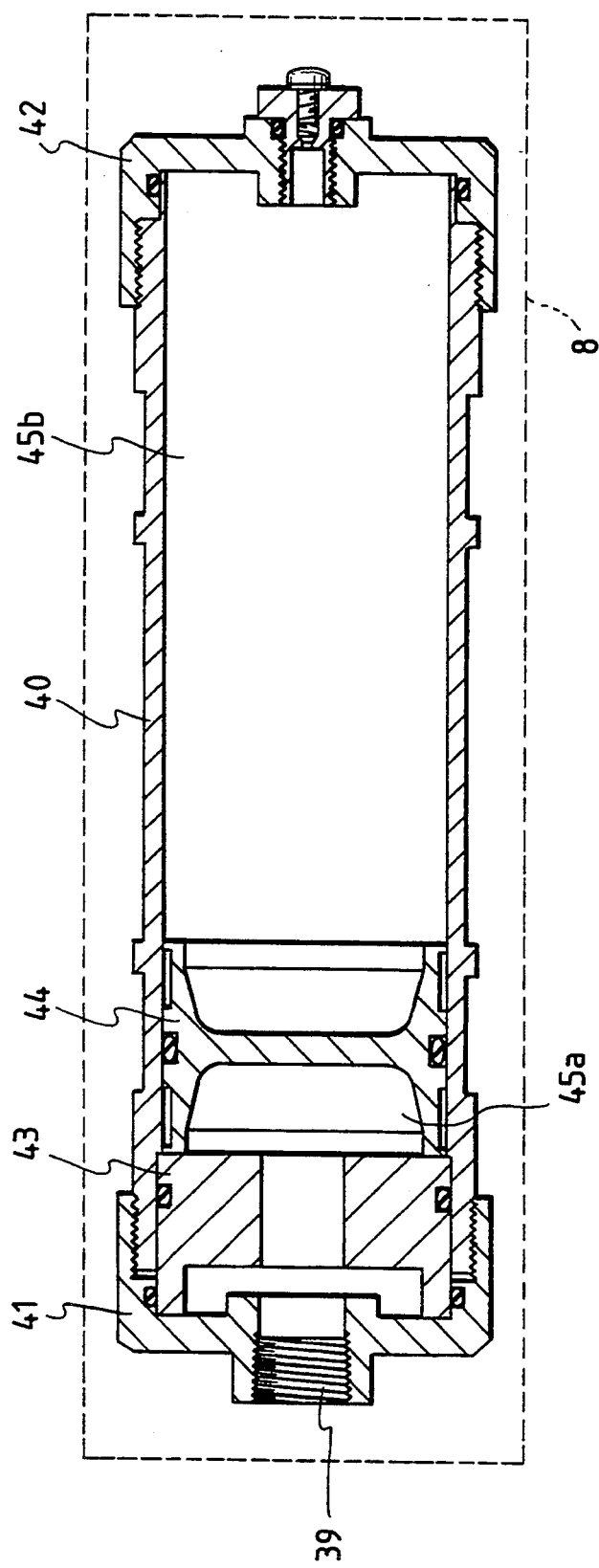
FIG. 4 is a sectional view which shows a structure of an accumulator employed in a hydraulic system of a suspension control system.

Referring to FIG. 4, the accumulator 8 is shown which includes a cylindrical housing 40. A left-hand cap 41 and a right-hand cap 42 are screwed into left-hand and right-hand ends of the cylindrical housing 40 respectively. A free piston 44 is slidably disposed in the cylindrical housing 40 and defines therein a hydraulic chamber 45a and a gas chamber 45b. A stopper 43 is secured to the left-hand end of the cylindrical housing 40 with the left-hand cap 41 for restricting movement of the free piston 44 toward the hydraulic chamber 45a.

The working fluid is introduced into the hydraulic chamber 45a from the cylinder 5 (see FIGS. 1 and 3) through the fluid passage 36 and a fluid passage 39 extending through the left-hand cap 41 and the stopper 43. The gas chamber 45b is filled with gas hermetically.

The accumulator 8 serves to selectively store the working fluid moved out of the upper and the lower chambers 34 and 35 in the cylinder 35 or to supply the working fluid to the upper and lower chambers. When the piston 31a slides in the cylinder 5, it will cause the volume of the cylinder 5 to be changed by the volume of a portion of the piston rod 31 moved in and out of the cylinder 5. When the volume of the cylinder 5 is decreased, an excess of working fluid is directed into the accumulator 8, while when the volume of the cylinder 5 is increased, a lack of working fluid is compensated by the working fluid supplied form the accumulator 8 to the upper and lower chambers 34 and 35.

During the flow of the working fluid into or from the hydraulic chamber 45a, the elasticity of gas in the gas chamber 45b enables the accumulator 8 to serve as a pneumatic spring. This spring function cushions hydraulic shock caused by movement of the variable throttle valve 114 between an open position and a closed position. Additionally, the spring function also serves to damp vibratory shock which may occur when the wheel 7 passes over a protrusion on a road surface.

The variable throttle valve 114 is, as shown in FIG. 1, arranged in the fluid passage 39 connecting between the cylinder 5 and the accumulator 8. The variable throttle valve 114 is designed to modify an effective cross-sectional area of the fluid passage 39 to control a damping force, or damping characteristics provided by the shock absorber 5A.

Figure 5:
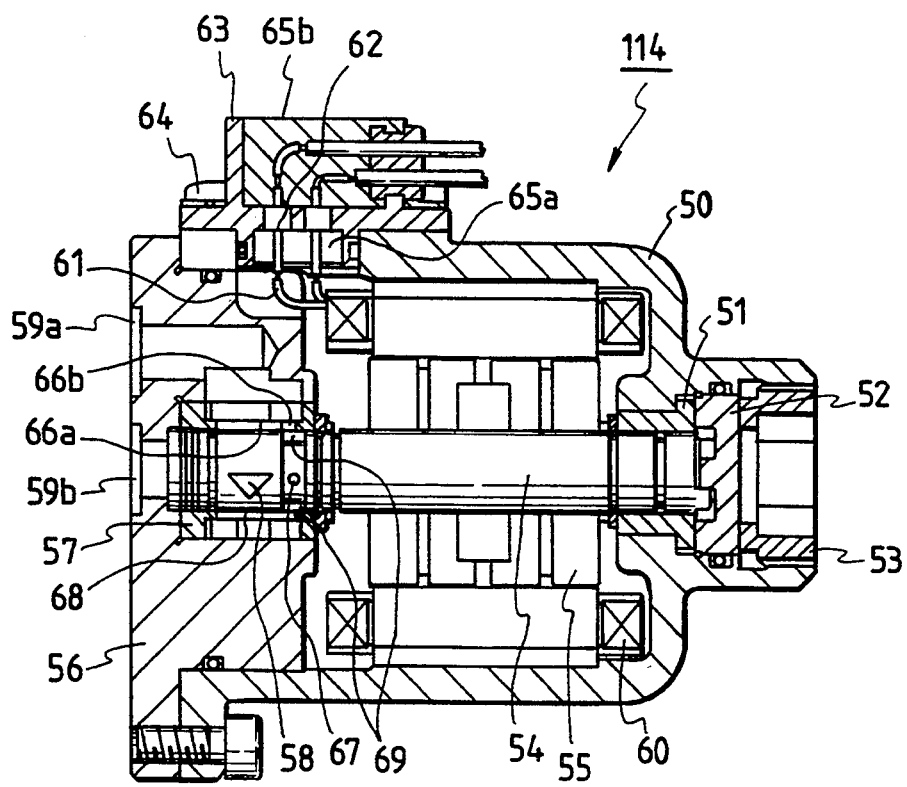
FIG. 5 is a sectional view which shows a structure of a variable throttle valve which is operable to modify a damping coefficient of a variable damping force shock absorber.

Referring to FIG. 5, a cross-sectional structure of the variable throttle valve 114 is shown. The variable throttle valve 114 includes a housing 50. A bushing 51 is fitted into a right-hand end of the housing 50. A stopper 52 extends between the bushing 51 and a bolt 53. The bolt 53 is screwed into the housing 50, pressing the bushing 51 against the housing through the stopper 52. The housing 50 accommodates a hollow shaft 54, the right-hand end of which is rotatably supported by the bushing 51. The housing 50 also accommodates a rotor 55 integrally mounted on the shaft 54 for rotational movement together with the shaft 54. The rotor 55 is urged to rotate under a magnetic field generated when a coil 60 is energized.

A connector block 63 is attached to the housing 50 with a screw 64. The connector block 63 includes terminals 62. Wires 61 are arranged to electrically connect the terminals 62 to the coil 60. Leads connected to the terminals 62 extend outward from the connector block 63 to an ECU 9, as will be described hereinafter in detail, so that an electric current is fed to the coil 60 through the leads and the wires 61. An inner side 65a and an outer side 65b of the connector block 63 are provided with sealing members respectively.

A plate 56 is press-fitted into a left-hand end of the housing 50 and fixed with screws. The left-hand end of the shaft 54 is rotatably supported by a bushing 57 fitted into a hole in the plate 56. The plate 56 has a port 59a in fluid communication with the upper and lower chambers 34 and 35 of the cylinder 5 through the fluid passage 36. The plate 56 also has a port 59b in fluid communication with the accumulator 8.

The port 59a communicates with a triangular hole 58 and a circular hole 67 extending through the walls of the shaft 54. The port 59b communicates with the triangular hole 58 and the circular hole 67 through an inner bore of the shaft 54 so that both ports 59a and 59b communicate with each other. A space (i.e., an annular groove) 69 defined around part of the shaft 54 is filled with the working fluid.

The ouside diameter of part of the shaft which has the triangular hole 58 is selected so that circumference surfaces of the shaft 54 can rotate in liquid-tight engagement with an outer member 68. On the other hand, the outside diameter of the part of the shaft in which the circular hole 67 is formed is set smaller than the outside diameter of the part of the shaft in which the triangular hole 58 is formed. The port 59a leads to a fluid port 66a being opened in a region immediately outward of the part of the shaft in which the triangular hole 58 is formed. In addition, the port 59a leads to a fluid port 66b being opened in a region immediately outward of the part of the shaft 54 in which the circular hole 67 is formed.

With the above arrangements, when the coil 60 is energized to produce a magnetic field, it will cause the rotor 55 to move, thereby rotating the shaft 54 so that an angular position of the triangular hole 58 is changed. When the triangular hole 58 is moved into communication with the fluid port 66a, the fluid communication between the ports 59a and 59b is established through the fluid port 66a, the triangular hole 58, and the inner bore of the shaft 54. The effective cross-sectional area of a passage providing the fluid communication between the ports 59a and 59b is determined by overlapping portions of the fluid port 59a and the triangular hole 58. It will be noted that the effective cross-sectional area of the communication passage depends on an angular position of the triangular hole 58 (i.e., the shaft 54) relative to the fluid port 66a. the effective cross-sectional area of the communication passage is defined as a degree of opening of the variable throttle valve 114.

When the working fluid flows from the port 59a to the port 59b, it is initially directed to the fluid ports 66a and 66b. The working fluid entering the fluid port 66b then flows onto the surface of the shaft 54 in which the circular hole 67 is formed, enters the inside of the shaft 54 through the circular hole 67, and leads to the port 59b. The working fluid entering the fluid port 66a, as long as the triangular hole 58 at least partly coincides with the fluid port 66a, is directed into the inside of the shaft 54, leading to the port 59b. Alternatively, when the triangular hole 58 is out of coincidence with the fluid port 66a, it will block the flow of the working fluid into the triangular hole 58.

In the above manner, the degree of opening of the variable throttle valve 114 is determined according to an effective cross-sectional area of the fluid communication between the triangular hole 58 and the fluid port 66a. It should be noted, however, that since the circular hole 67 is normally opened, a small amount of the working fluid flows to the port 59b through the circular hole even when the triangular hole 58 is completely out of the communication with the fluid port 66a.

When the working fluid flows from the port 59b to the port 59b, the flow of the working fluid is controlled in a similar manner, as described above.

Referring back to FIG. 1, the suspension control system of this invention further includes a vehicle height sensor 4, a vertical acceleration sensor 2, and an electronic control unit (ECU) 9. The vehicle height sensor 4 is arranged between the vehicle body 1 and the suspension member 3 for detecting a relative displacement therebetween to provide a sensor signal indicative thereof to the ECU 9. The vertical acceleration sensor 2 is mounted on a bottom portion of the vehicle body 1 to detect vertical acceleration acting on the vehicle body to provide a sensor signal indicative thereof to the ECU 9.

The ECU 9 includes a microcomputer or a similar device provided with a central processing unit (CPU), a ROM, a RAM, and an input/output (I/O) port, and is operable to modify the degree of opening of the variable throttle valve 114 based on the sensor signals from the vertical acceleration sensor 2 and the vehicle height sensor 4.

Figure 2:
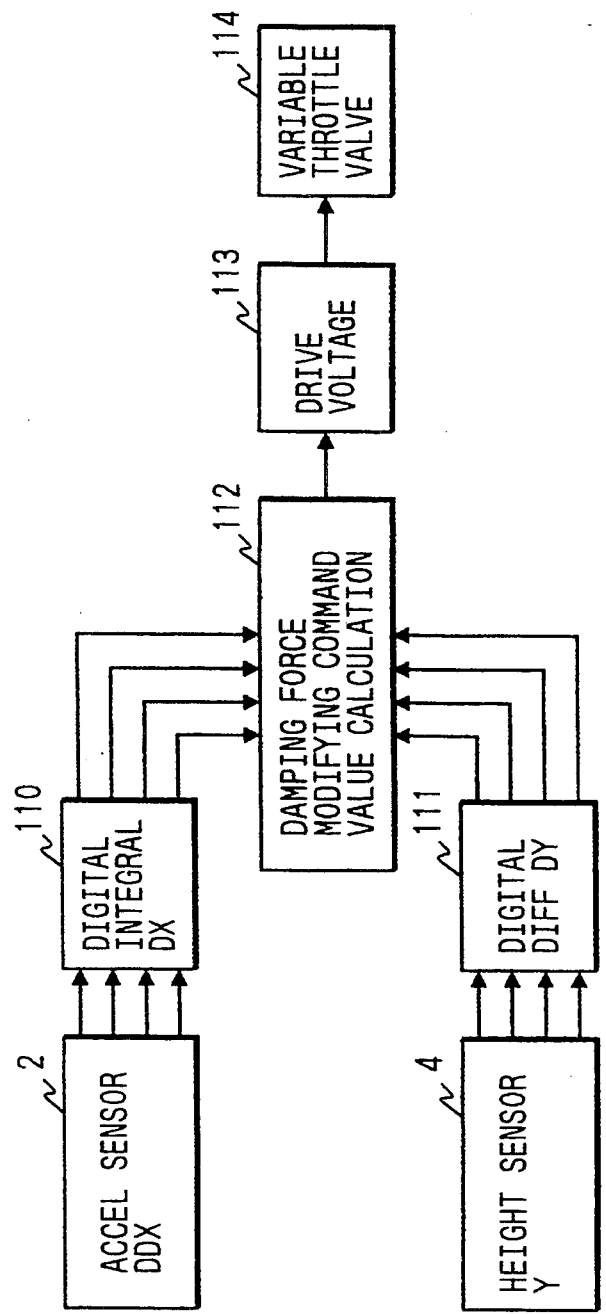
FIG. 2 is a flow diagram which shows an operation of an electronic control unit of a suspension control system.

FIG. 2 shows a block diagram demonstrating an operation of the ECU 9. The sensor signal from the vertical acceleration sensor 2 is digitized into a digital acceleration detection signal DDX. In an operational block 110, the digital acceleration detection signal DDX is then integrated into a digital signal indicative of a vertical speed DX of a sprung member which indicates vibratory conditions of the vehicle body 1. The vertical speed DX represents a positive value when the sprung member is moved upward.

The sensor signal from the vehicle height sensor 4 is digitized into a digital vehicle height detection signal (representing a vertical displacement between the sprung and unsprung members) Y. In an operational block 111, the digital vehicle height detection signal Y is differentiated into a digital height detection signal DY representing a relative vertical displacement speed between the sprung member and the unsprung member which assumes a positive valve in an extension direction of the coil spring 6, or extension stroke of the shock absorber 5A.

It should be noted that the characters DX, DY, and DDX denote functions as $DX=dx/dt$, $DY=dy/dt$, and $DDX=d^2x/dt^2$.

In an operational block 112, coordinates (DX, DY) in a map, as will be described hereinafter, are determined based on the vertical sprung speed DX derived in the block 110 and the sprung-unsprung relative displacement speed DY derived in the block 111. In other words, it is determined which area defined by the vertical sprung speed DY and the sprung-unsprung relative displacement speed DY the coordinates (DX, DY) lie.

Figure 13:
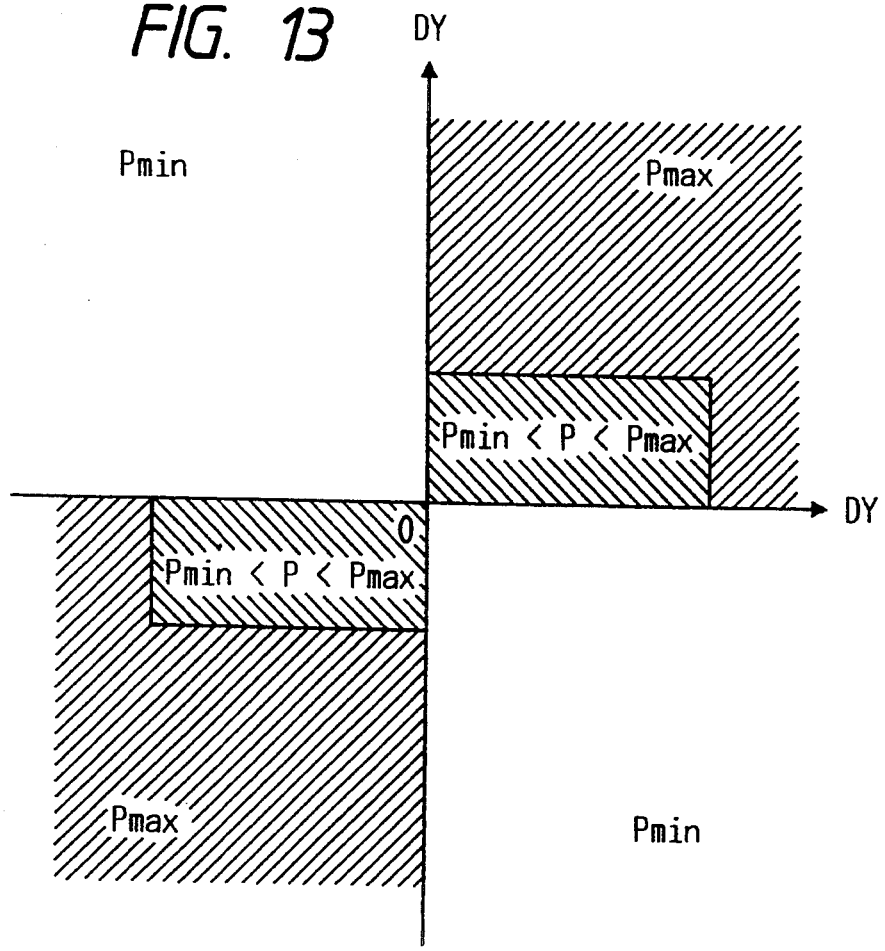
FIG. 13 is a map which shows an example of a damping force modifying command value P determined by the relation between vertical sprung speed DX and sprung-unsprung relative displacement speed DY according to the present invention.

For example, as shown in FIG. 13, in the second and fourth quadrants on a coordinate plane (as will be hereinafter referred to as a DX-DY coordinate plane) defined by coordinate axes representing the vertical sprung speed DX and the sprung-unsprung relative displacement speed DY, a minimum damping force modifying command value P (=Pmin) is provided for producing a minimum level of damping force. In the first and third quadrants, the vertical sprung speed DX and the sprung-unsprung relative displacement speed DY represent opposite phases. On the other hand, in the first and third quadrants (i.e., hatched areas) wherein the vertical sprung speed DX and the sprung-unsprung relative displacement speed DY represent the same phase, a maximum or a medium damping force modifying command value P (=Pmax or Pmin<P<Pmax) is provided for producing a maximum or a medium level of damping force based on values of the vertical sprung speed DX and the sprung-unsprung relative displacement speed DY.

In an operational block 113, the damping force modifying command value P derived in the operational block 112 is converted into a drive voltage V which is applied to the coil 60 of the variable throttle valve 114 so that the degree of opening of the variable throttle valve 114 is adjusted to modify a damping coefficient of the shock absorber 5A.

Figure 6:
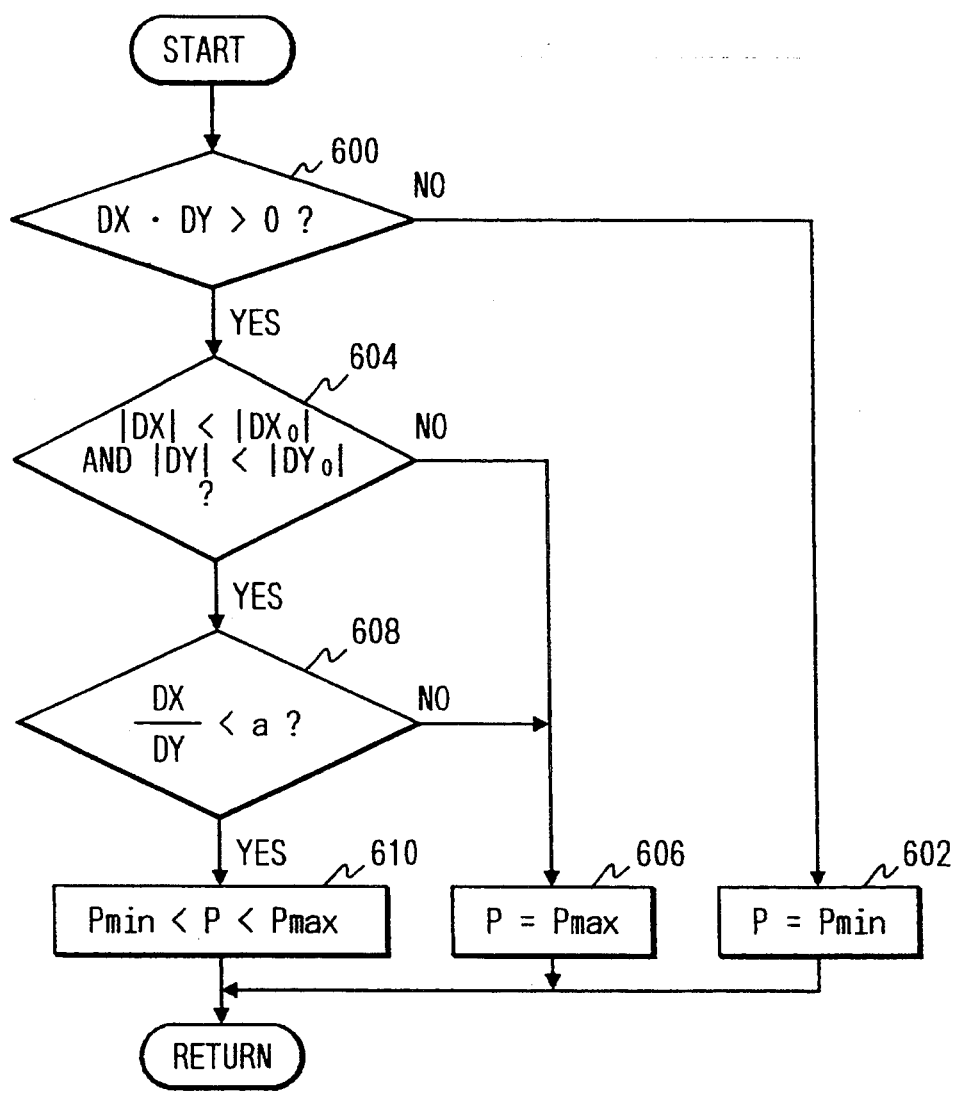
FIG. 6 is a flowchart which shows damping force modifying logical steps performed by an electronic control unit of a suspension control system.

Referring to FIG. 6, there is shown a flowchart of a program or sequence of logical steps performed in the operational block 112 which mathematically provides the damping force modifying command value P.

After entering the program, the routine proceeds to step 600 wherein it is determined whether a product of the vertical sprung speed DX derived in block 110 and the sprung-unsprung relative displacement speed DY derived in block 111 is greater than zero or not. This determination is made for determining whether the vertical sprung speed DX and the sprung-unsprung relative displacement speed DY are in the same phase (i.e., in the first or third quadrants) or not (i.e., in the second or fourth quadrants).

If a NO answer is obtained (DX·DY≦0), concluding that the vertical sprung speed DX and the sprung-unsprung relative displacement speed DY represent opposite phases, the routine then proceeds to step 602 wherein the minimum damping force modifying command value Pmin is provided.

If a YES answer is obtained in step 600 (DX·DY>0), concluding that the vertical sprung speed DX and the sprung-unsprung relative displacement speed DY are in the same phase, the routine then proceeds to step 604 wherein it is determined whether or not an absolute value of the vertical sprung speed |DX| is smaller than a preselected vertical sprung speed threshold value |DX₀| and an absolute value of the sprung-unsprung relative displacement speed |DY| is smaller than a preselected sprung-unsprung relative displacement speed threshold value |DY₀|. This determination is made for determining an area in which the damping force modifying command value P is continuously varied over a range from the maximum damping force modifying command value Pmax to the minimum damping force modifying command value Pmin.

If a NO answer is obtained in step 604, (|DX|≦|DX₀|, |DY|≦|DY₀|), the routine then proceeds to step 606 wherein the maximum damping force modifying command value Pmax is provided.

Alternatively, if a YES answer is obtained in step 604, (|DX|<|DX₀|, |DY|<|DY₀|), the routine then proceeds to step 608 wherein it is determined whether or not a quotient of the vertical sprung speed DX and the sprung-unsprung relative displacement speed DY or a ratio of DX to DY is smaller than a preselected threshold value a (DX/DY<a ?). If a NO answer is obtained (DX/DY≧a), the routine then proceeds to step 606 wherein the maximum damping force modifying command value Pmax is provided.

Alternatively, if a YES answer is obtained in step 608 (DX/DY<a), the routine then proceeds to step 610 wherein the damping force modifying command value P is continuously varied between the maximum and minimum damping force modifying command values Pmax and Pmin based on a value of DX/DY.

Figure 7:
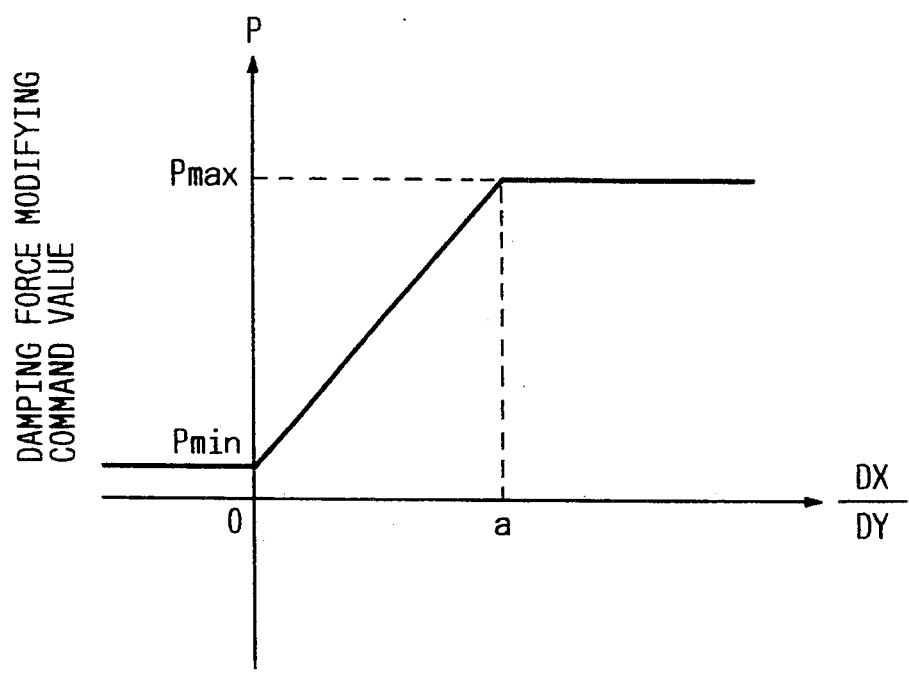
FIG. 7 is a graph which shows the relation between a damping force modifying command value P and a ratio of vertical sprung speed DX to sprung-unsprung relative displacement speed DY.

FIG. 7 shows the relation between the damping force modifying command value P and the value of DX/DY. As can be seen in the drawing, when the value of DX/DY represents zero (DX/DY=0), the minimum damping force modifying command value Pmin is provided, while when the value of DX/DY represents the threshold value a, the maximum damping force modifying command value Pmax is provided. When the value of DX/DY falls within a range from zero to a, the damping force modifying command value P is increased in a preselected relation to an increase in the value of DX/DY.

Figure 14:
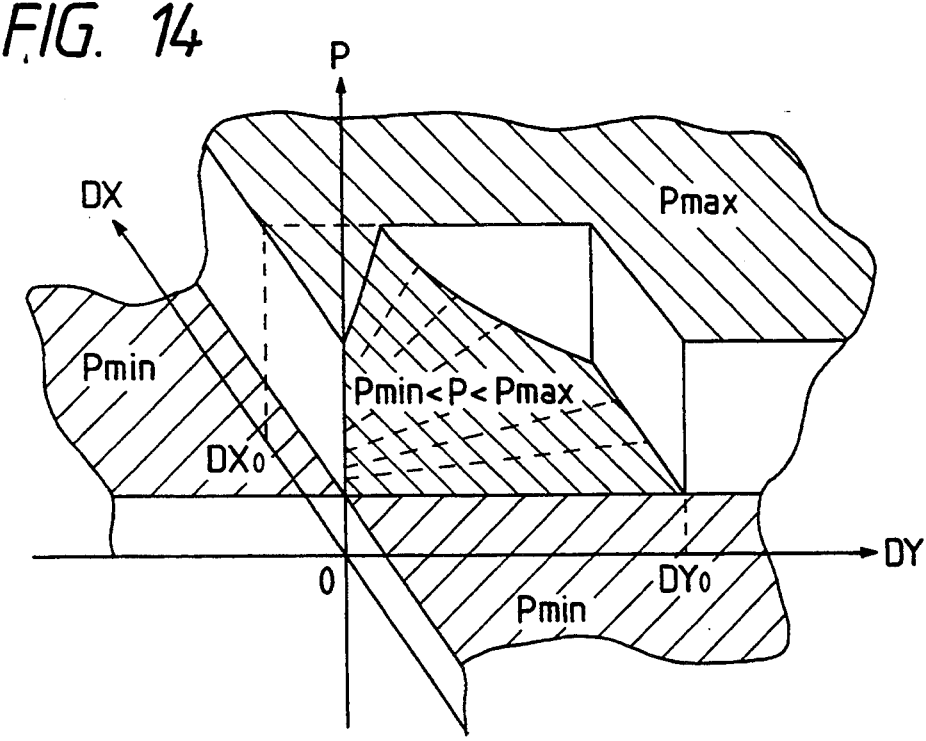
FIG. 14 is a three-dimensional map which shows variation in a damping force modifying command value P in the first quadrant on a DX–DY coordinate plane according to a first embodiment, as shown in FIG. 6.

FIG. 14 shows a three-dimensional map which demonstrates a variation in the damping force modifying command value P only in the first quadrant on the DX-DY coordinate plane for the sake of brevity. The map shows that in a region around the origin on the DX-DY plane, an intermediate damping force modifying command value P is provided according to the value of DX/DY for serving to optimize a damping force against high-frequency vibrations to improve firm riding comfort caused by the high-frequency vibrations and to reduce control discomfort and noise.

In a region away from the origin which is out of the region in which the damping force modifying command value P is continuously varied, the maximum damping force modifying command value Pmax is, as already mentioned, provided to damp low-frequency vibrations effectively.

As described above, the suspension control system of this embodiment is operable to provide a suitable damping force against high and low-frequency vibrations while optimizing both riding comfort and vehicle handling ability.

Figure 8:
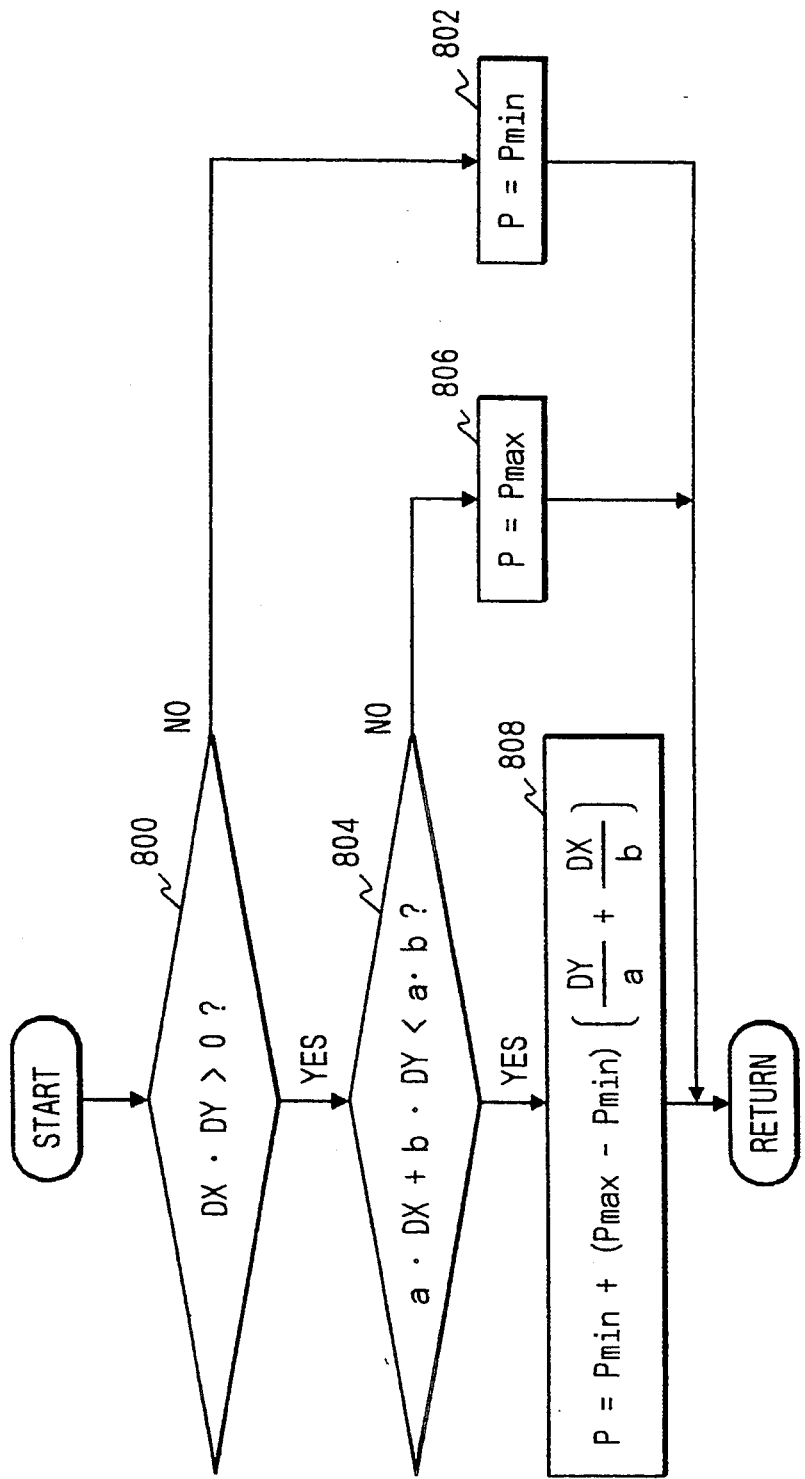
FIG. 8 is a flowchart according to a second embodiment of damping force modifying logical steps performed by an electronic control unit of a suspension control system.

Referring to FIG. 8, there is shown alternative logical steps which may be performed in the operational block 112.

In step 800, the same determination as in step 600 is made whether the vertical sprung speed DX and the sprung-unsprung relative displacement speed DY are in the same phase or not.

If a NO answer is obtained (DX·DY≦0), concluding that the vertical sprung speed DX and the sprung-unsprung relative displacement speed DY represent opposite phases, the routine then proceeds to step 802 wherein the minimum damping force modifying command value Pmin is provided.

Alternatively, if a YES answer is obtained in step 800 (DX·DY>0), concluding that the vertical sprung speed DX and the sprung-unsprung relative displacement speed DY are in the same phase, the routine then proceeds to step 804 wherein using the following linear expression (1) of the vertical sprung speed DX and the sprung-unsprung relative displacement speed a determination is made whether vehicular behavior lies in a region around the origin on the DX-DY coordinate plane.

$$a \cdot DX + b \cdot DY < a \cdot b \quad (1)$$

If the above condition (1) is not satisfied, the routine then proceeds to step 806 wherein the maximum damping force modifying command value Pmax is provided.

Alternatively, if a YES answer is obtained in step 804, concluding that the above condition (1) is satisfied, the routine then proceeds to step 808 wherein the damping force modifying command value P is derived according to the following equation.

$$P = Pmin + (Pmax - Pmin)(DY/a + DX/b) \quad (2)$$

Figure 15:
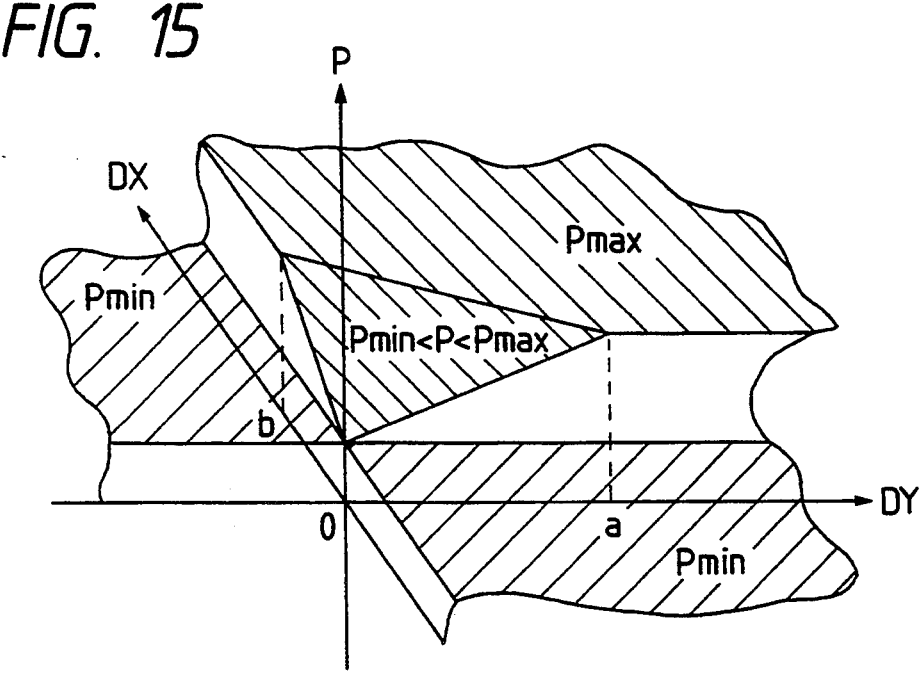
FIG. 15 is a three-dimensional map which shows variation in a damping force modifying command value P in the first quadrant on a DX–DY coordinate plane according to a second embodiment, as shown in FIG. 8.

FIG. 15 shows a three-dimensional map which demonstrates a variation in the damping force modifying command value P according to the above equation (2). The map shows that in a triangular region defined by the origin and the values a and b, the damping force modifying command value P is increased according to increases in the vertical sprung speed DX and the sprung-unsprung relative displacement speed DY. The second embodiment offers the same effect as in the first embodiment.

Figure 9:
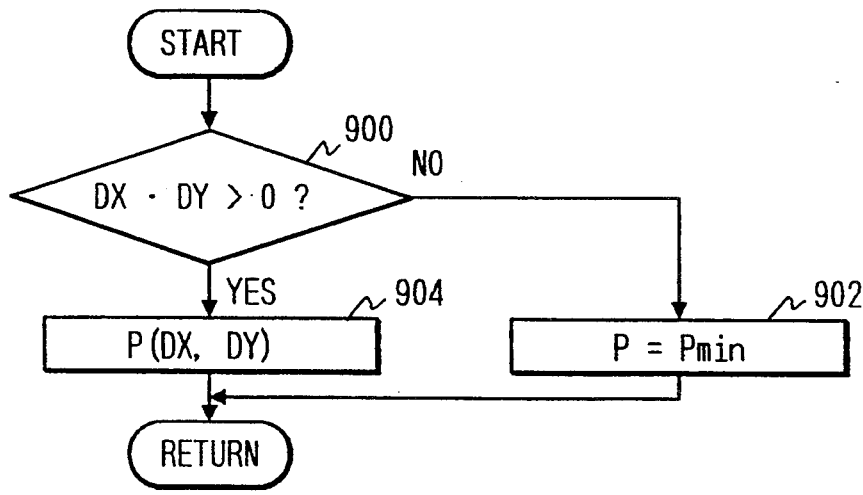
FIG. 9 is a flowchart according to a third embodiment of damping force modifying logical steps performed by an electronic control unit of a suspension control system.

Referring to FIG. 9, there is shown a third embodiment of logical steps performed in the operational block 112.

In step 900, it is determined whether the same determination as in step 600 is made whether the vertical sprung speed DX and the sprung-unsprung relative displacement speed DY are in the same phase or not.

If a NO answer is obtained (DX·DY≦0), concluding that the vertical sprung speed DX and the sprung-unsprung relative displacement speed DY represent opposite phases, the routine then proceeds to step 902 wherein the minimum damping force modifying command value Pmin is provided.

Figure 10:
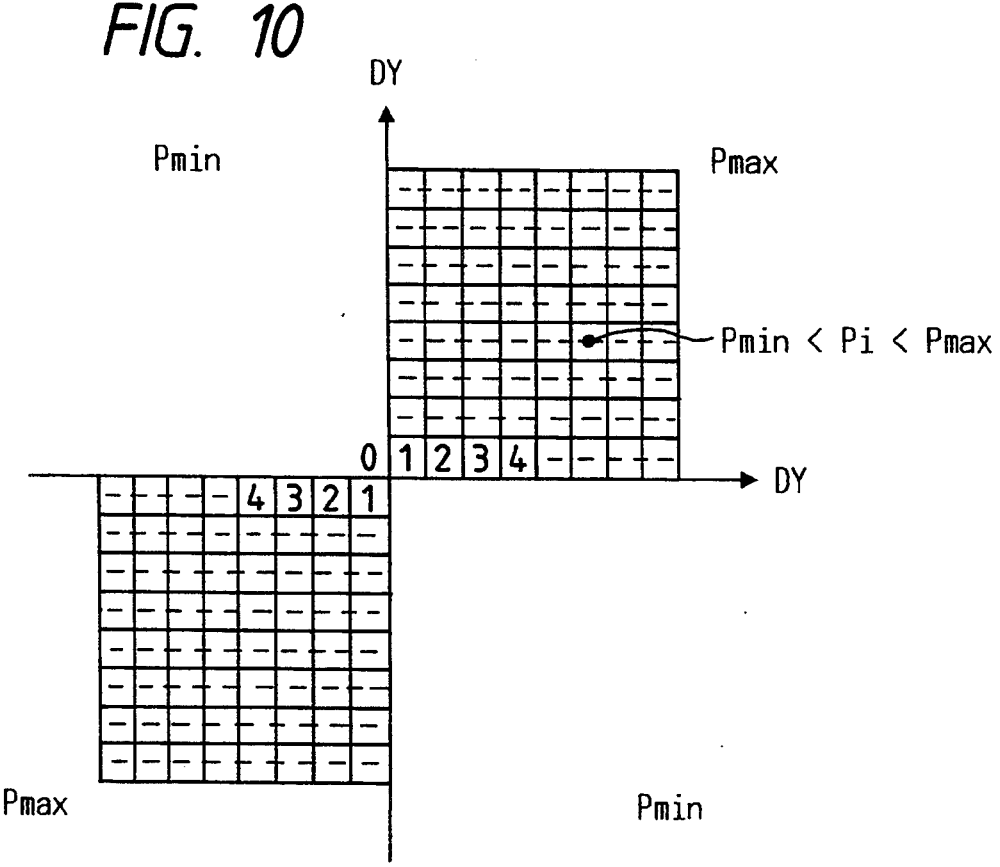
FIG. 10 is a map which shows a damping force modifying command value P determined by the relation between vertical sprung speed DX and sprung-unsprung relative displacement speed DY in a third embodiment, as shown in FIG. 9.

Alternatively, if a YES answer is obtained in step 900 (DX·DY≦0), concluding that the vertical sprung speed DX and the sprung-unsprung relative displacement speed DY are in the same phase, the routine then proceeds to step 904 wherein the damping force modifying command value P is determined by look-up using mapped data, as shown in FIG. 10.

The map in FIG. 10 has a plurality of damping force modifying command values Pi which are plotted on coordinates of a number of n×n in the first and third quadrants respectively.

Figure 16:
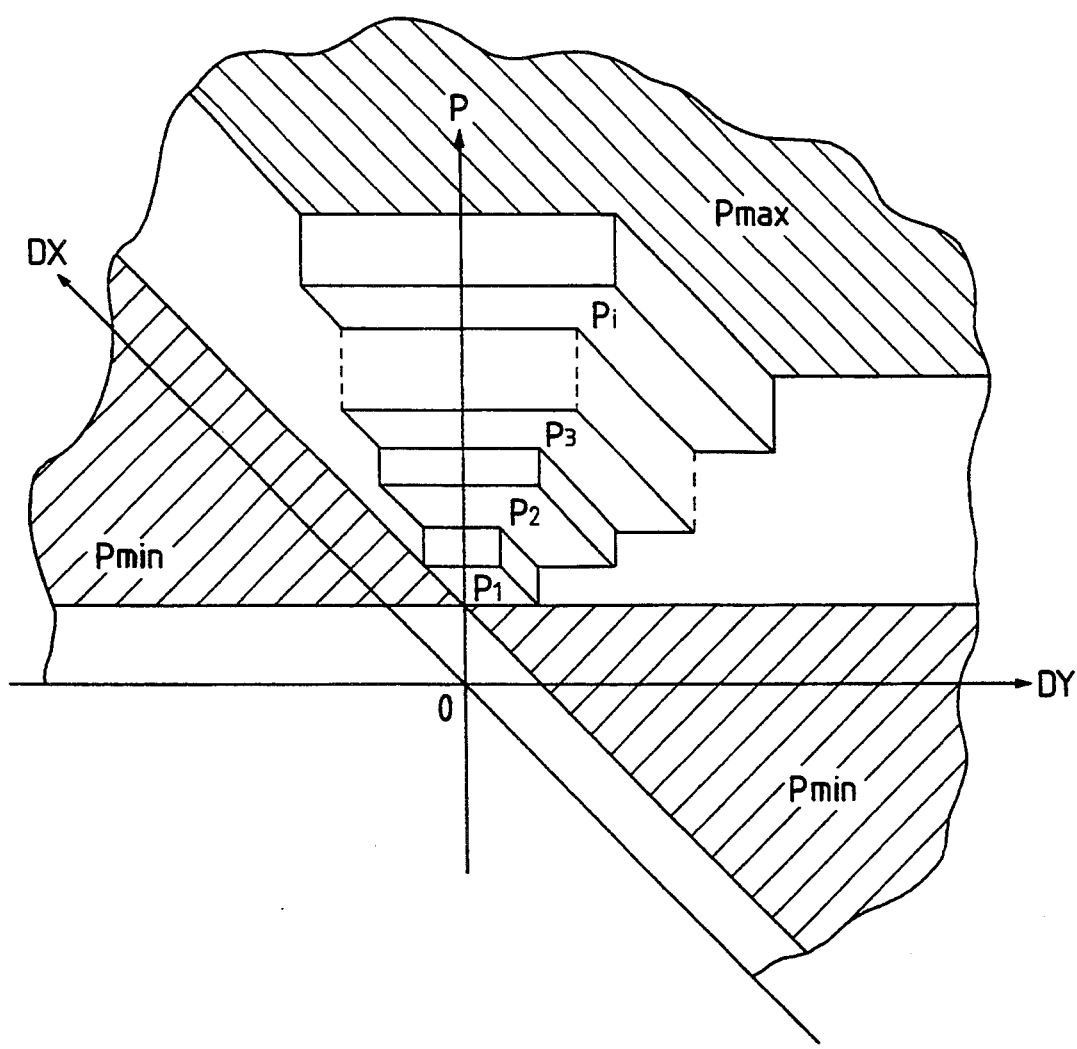
FIG. 16 is a three-dimensional map which shows variation in a damping force modifying command value P in the first quadrant on a DX–DY coordinate plane according to a third embodiment, as shown in FIG. 9.

FIG. 16 shows a three-dimensional map which represents a variation in the damping force modifying command value P in the first quadrant on the DX-DY coordinate plane derived using the mapped data as shown in FIG. 10. As can be seen, in the region around the origin, the damping force modifying command value P is increased in a stepwise fashion according to the vertical sprung speed DX and the sprung-unsprung relative displacement speed DY.

Figure 11:
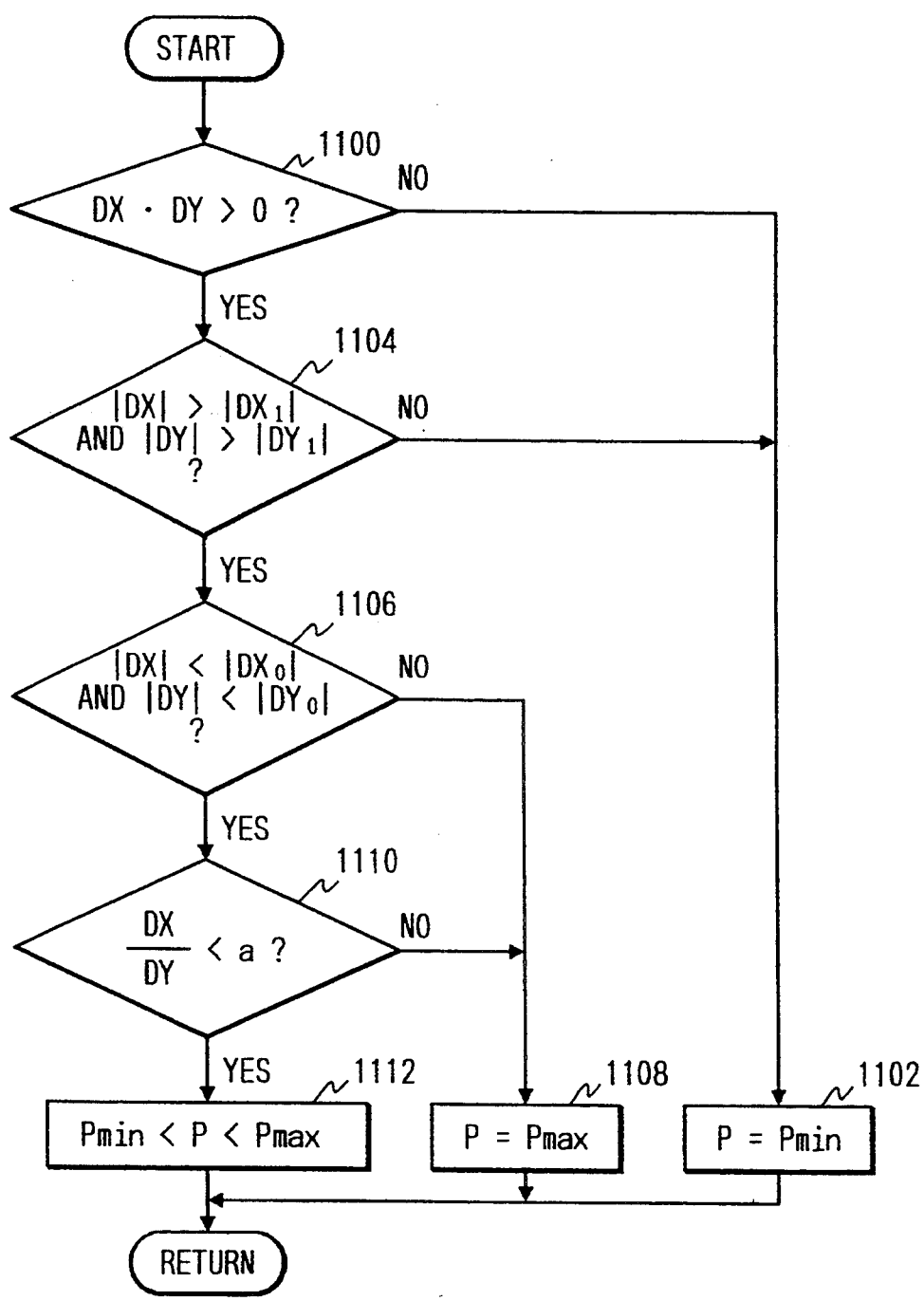
FIG. 11 is a flowchart according to a fourth embodiment of damping force modifying logical steps performed by an electronic control unit of a suspension control system.

Referring to FIG. 11, there is shown a fourth embodiment of logical steps performed in the operational block 112 which is different from the logical steps of the first embodiment, as shown in FIG. 6, only in that step 1104 is provided after the same step 1100 as step 600.

Figure 17:
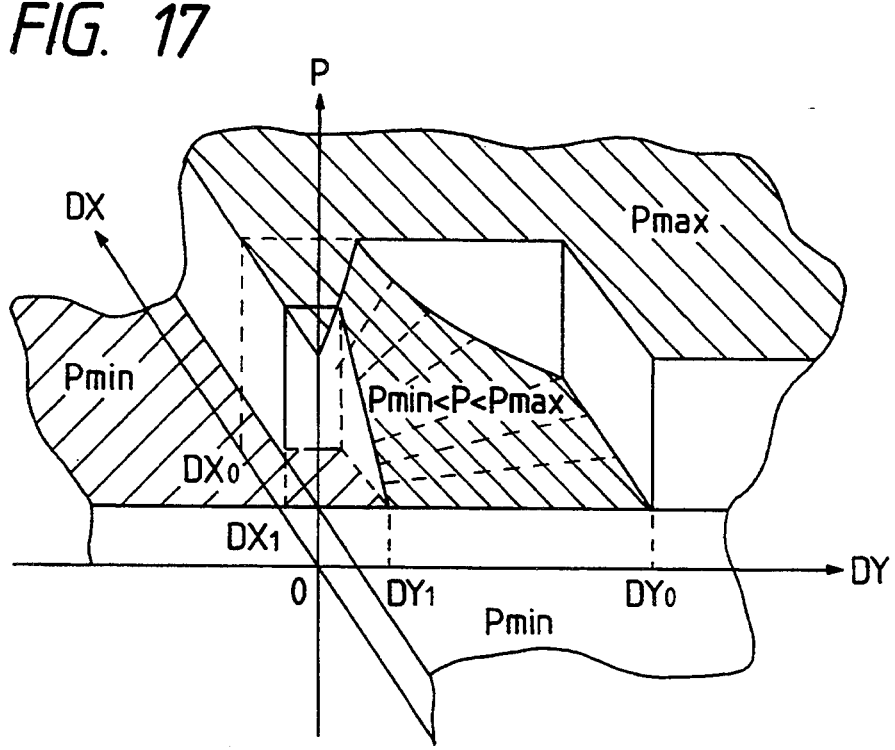
FIG. 17 is a three-dimensional map which shows variation in a damping force modifying command value P in the first quadrant on a DX–DY coordinate plane according to a fourth embodiment, as shown in FIG. 11.

In step 1104, it is determined whether or not an absolute value of the vertical sprung speed $|DX|$ is greater than a preselected vertical sprung speed threshold value $|DX_1|$ and an absolute value of the sprung-unsprung relative displacement speed $|DY|$ is greater than a preselected sprung-unsprung relative displacement speed threshold value $|DY_1|$. The vertical sprung speed threshold value $|DX_1|$ and the sprung-unsprung relative displacement speed threshold value $|DY_1|$ are smaller than the threshold values $|DX_0|$ and $|DY_0|$. The determination in step 1104 is made for determining whether or not coordinates defined by the values $|DX|$ and $|DY|$ lies out of an additional region, as shown in FIG. 17. defined by the origin and the threshold values $|DX_1|$ and $|DY_1|$.

If a NO answer is obtained in step 1104 ($|DX| \leq |DX_1|$, $|DY| \leq |DY_1|$), concluding that the coordinates defined by the values $|DX|$ and $|DY|$ fall in the additional region provided close to the origin, the routine then proceeds to step 1102 wherein the minimum damping force modifying command value Pmin is provided.

Alternatively, if a YES answer is obtained in step 1104, concluding that the coordinates defined by the values |DX| and |DY| are out of the additional region, the routine then proceeds to step 1106 wherein the same determination as in step 604 in the first embodiment is made.

Under the above damping force control, damping force modification is not carried out when the vehicle is essentially traveling on an even road surface, traveling at a very low speed, or parked, thereby preventing the mechanical shock and noise caused by the damping force switching operation of the shock absorber from occurring. In addition, the number of damping force switching cycles of the shock absorber is reduced, resulting in improved durability thereof.

Figure 12:
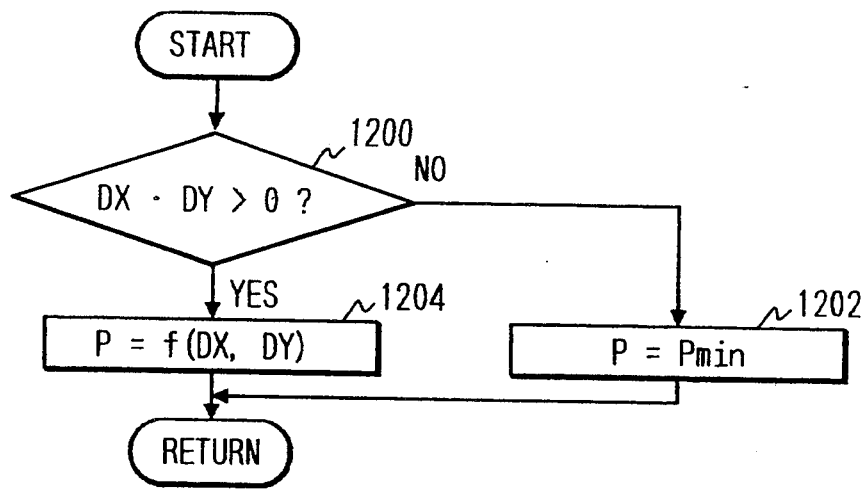
FIG. 12 is a flowchart according to a fifth embodiment of damping force modifying logical steps performed by an electronic control unit of a suspension control system.

Referring to FIG. 12, a fifth embodiment of logical steps performed in the block 112 is shown which corresponds to one which replaces step 904 with step 1204 in the program, as shown in FIG. 9.

In step 1204, the damping force modifying command value P is determined according to the relation given below.

$$P = (Pmax - Pmin) \cdot \tan^{-1}\{0.0166(DX^2 + DY^2)^{\frac{1}{2}}\} + Pmin \quad (3)$$

Figure 18:
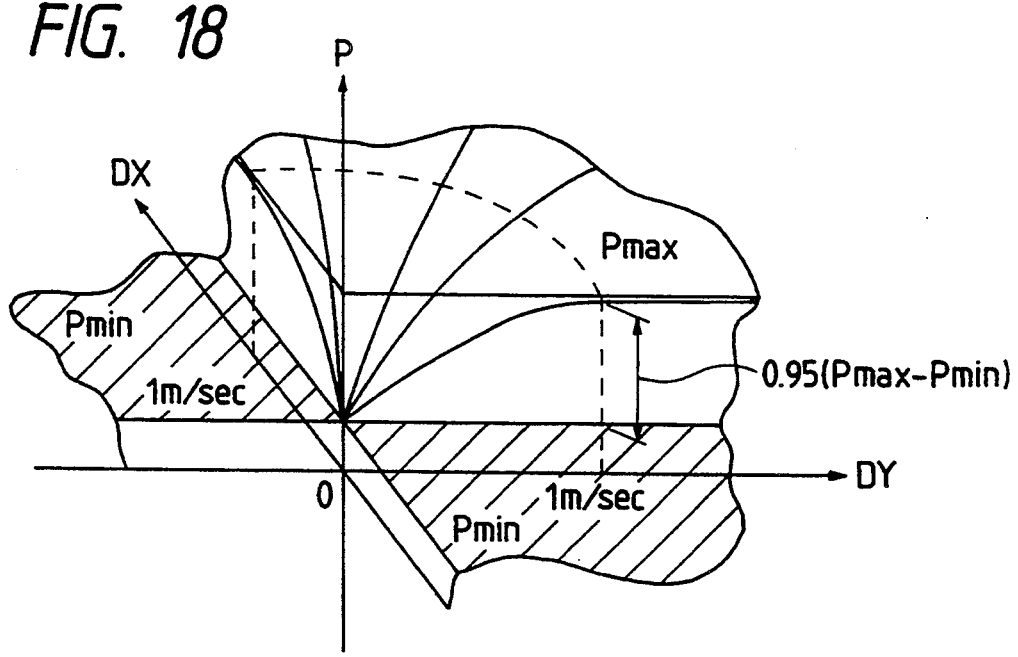
FIG. 18 is a three-dimensional map which shows variation in a damping force modifying command value P in the first quadrant on a DX–DY coordinate plane according to a fifth embodiment, as shown in FIG. 12.

According to the above equation, as shown in FIG. 18, when the vertical sprung speed DX and the sprung-unsprung relative displacement speed DY becomes 1 m/sec., a damping force modifying command value of 95% of a difference between the maximum and minimum damping force modifying command values Pmax and P min (i.e., 0.95(Pmax−Pmin)) is provided. Additionally, in a region out of the boundary area, as shown by a broken line, which is defined by an arc extending through the vertical sprung speed DX of 1 m/sec, and the sprung-unsprung relative displacement speed DY of 1 m/sec., a damping force modifying command value approximating the maximum value Pmax is provided. When approaching the origin, the damping force modifying command value P is decreased toward the minimum value Pmin.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments without departing from the principle of the invention as set forth in the appended claims.

What is claimed is:

1. A suspension control system for an automotive vehicle operable to control transmission of vibratory energy from a road surface to a vehicle body, comprising:
    a shock absorber disposed between the vehicle body and a road wheel, said shock absorber providing a variable damping force;
    vibration detecting means for detecting a vibratory condition of the vehicle body in a vertical direction to determine a sprung speed of a sprung portion of said vehicle;
    sprung-unsprung relative displacement speed determining means for determining a vertical sprung-unsprung relative displacement speed between said sprung portion and an unsprung portion of said vehicle; and
    signal setting means for setting a damping force modifying command signal to modify said damping force of said shock absorber, based on said sprung speed and said sprung-unsprung relative displacement speed, to produce a damping force which is smaller than a maximum level determined in a preselected relation to said sprung speed and said sprung-unsprung relative displacement speed within first regions defined around an origin in first and third quadrants on a coordinate plane defined by coordinate axes indicative of said sprung speed and said sprung-unsprung relative displacement speed;
    wherein said signal setting means sets said damping force modifying command signal to produce a damping force of said maximum level within regions outside of said first regions in said first and third quadrants.

2. A suspension control system as set forth in claim 1, wherein second regions are defined within said first regions closer to the origin in said first and third quadrants respectively, said signal setting means setting said damping force modifying command signal to produce a damping force of a minimum level within said second regions.

3. A suspension control system as set forth in claim 1, wherein said signal setting means sets said damping force modifying command signal to produce a damping force which decreases as an absolute value of said sprung speed and an absolute value of said sprung-unsprung relative displacement speed decrease within said first regions.

4. A suspension control system as set forth in claim 1, wherein said signal setting means sets said damping force modifying command signal to produce a damping force which varies among a plurality of different levels based on said sprung speed and said sprung-unsprung relative displacement speed within said first regions.

5. A suspension control system as set forth in claim 1, wherein said signal setting means sets said damping force modifying command signal to produce a variable damping force which is determined in a preselected relation ratio of said sprung speed to said sprung-unsprung relative displacement speed within said first regions.

6. A suspension control system for an automotive vehicle operable to control transmission of vibratory energy from a road surface to a vehicle body, comprising:
    a shock absorber disposed between the vehicle body and a road wheel, said shock absorber providing a variable damping force;
    vibration detecting means for detecting a vibratory condition of the vehicle body in a vertical direction to determine a sprung speed of a sprung portion of said vehicle;
    sprung-unsprung relative displacement speed determining means for determining a vertical sprung-unsprung relative displacement speed between said sprung portion and an unsprung portion of said vehicle; and
    signal setting means for setting a damping force modifying command signal to modify said damping force of said shock absorber, based on said sprung speed and said sprung-unsprung relative displacement speed, to produce a damping force which is smaller than a maximum level determined in a preselected relation to said sprung speed and said sprung-unsprung relative displacement speed within first regions defined around an origin in first and third quadrants on a coordinate plane defined by coordinate axes indicative of said sprung speed and said sprung-unsprung relative displacement speed;

wherein second regions are defined within said first regions closer to said origin in said first and third quadrants respectively, said signal setting means setting said damping force modifying command signal to produce a damping force of a minimum level within said second regions.

7. A suspension control system for an automotive vehicle operable to control transmission of vibratory energy from a road surface to a vehicle body, comprising:

a shock absorber disposed between the vehicle body and a road wheel, said shock absorber providing a variable damping force;

vibration detecting means for detecting a vibratory condition of the vehicle body in a vertical direction to determine a sprung speed of a sprung portion of said vehicle;

sprung-unsprung relative displacement speed determining means for determining a vertical sprung-unsprung relative displacement speed between said sprung portion and an unsprung portion of said vehicle; and signal setting means for setting a damping force modifying command signal to modify said damping force of said shock absorber, based on said sprung speed and said sprung-unsprung relative displacement speed, to produce a damping force which is smaller than a maximum level determined in a preselected relation to said sprung speed and said sprung-unsprung relative displacement speed within first regions defined around an origin in first and third quadrants on a coordinate plane defined by coordinate axes indicative of said sprung speed and said sprung-unsprung relative displacement speed;

wherein said signal setting means sets said damping force modifying command signal to produce a damping force which decreases as an absolute value of said sprung speed and an absolute value of said sprung-unsprung relative displacement speed decrease within said first regions, said signal setting means setting said damping force modifying command signal to produce a damping force of said maximum level outside of said first regions.

8. A suspension control system for an automotive vehicle operable to control transmission of vibratory energy from a road surface to a vehicle body, comprising:

a shock absorber disposed between said vehicle body and a road wheel, said shock absorber providing a variable damping force;

vibration detecting means for detecting a vibratory condition of said vehicle body in a vertical direction to determine a sprung speed of a sprung portion of said vehicle;

sprung-unsprung relative displacement speed determining means for determining a vertical sprung-unsprung relative displacement speed between said sprung portion and an unsprung portion of said vehicle; and signal setting means for setting a damping force modifying command signal to modify said variable damping force of said shock absorber, based on said sprung speed and sprung-unsprung relative displacement speed, to produce an intermediate level damping force which represents an intermediate level between maximum and minimum damping force levels determined in a preselected relation to said sprung speed and said sprung-unsprung relative displacement speed within first regions defined around an origin in first and third quadrants on a coordinate plane defined by coordinate axes indicative of said sprung speed and said sprung-unsprung relative displacement speed;

wherein said signal setting means sets said damping force modifying command signal to provide a damping force of said maximum level within regions outside said first regions in said first and third quadrants.

9. A suspension control system as set forth in claim 8, wherein said intermediate level of said damping force is continuously varied between said maximum and minimum levels based on said sprung speed and said sprung-unsprung relative displacement speed within said first regions.

10. A suspension control system for an automotive vehicle, comprising:

a variable damping force shock absorber arranged between a vehicle body and a suspension member supporting a road wheel rotatably;

vertical speed determining means for determining a vertical speed of said vehicle body and for providing a signal indicative thereof;

relative displacement speed determining means for determining a speed of relative displacement between said vehicle body and said suspension member and for providing a signal indicative thereof; and damping force control means, responsive to said signals from said vertical speed determining means and said relative displacement speed determining means, for controlling a damping force of said variable damping force shock absorber over a range from preselected maximum to minimum levels in a given relation to said vertical speed of said vehicle body and said relative displacement speed between said vehicle body and said suspension member, when said vertical speed and said relative displacement speed are smaller than preselected first and second threshold values respectively during vibratory motion of said vehicle body and said vertical speed and said relative displacement speed represent a same phase wherein said damping force control means controls said variable damping force shock absorber to produce a damping force of a preselected level variable between said maximum level and said minimum level.

11. A suspension control system as set forth in claim 10, wherein said damping force control means provides a damping force modifying command value P to said shock absorber to modify said variable damping force thereof, said damping force modifying command value P being determined according to a relation of $P = P_{min} + (P_{max} - P_{min})(DX/DY)/a$ where Pmax indicates said maximum level, Pmin denotes said minimum level, DX denotes said vertical speed of said vehicle body, DY denotes said relative displacement speed between said vehicle body and said suspension member, and a denotes a preselected value of DX/DY, when said vertical speed and said relative displacement speed are smaller than said preselected first and second threshold values respectively, are in a same phase, and when a ratio of said vertical speed and said relative displacement speed is smaller than a preselected value.

12. A suspension control system as set forth in claim 11, wherein said damping force control means controls said shock absorber to produce a damping force of a level which increases from said minimum level to said maximum level according to increases in said vertical speed of said vehicle body and said relative displacement speed between said vehicle body and said suspension member when said vertical speed and said relative displacement speed are smaller than said preselected first and second threshold values respectively during said vibratory motion of said vehicle body and said vertical speed and said relative displacement speed assume said same phase.

13. A suspension control system as set forth in claim 12, wherein said damping force control means provides a damping force modifying command value P to said shock absorber to modify said damping force thereof, said damping force modifying command value P being determined according to a relation of $P = Pmin + (Pmax - Pmin)(DY/a + DX/b)$ where Pmax indicates said maximum level, Pmin denotes said minimum level, DX denotes said vertical speed of said vehicle body, DY denotes said relative displacement speed between said vehicle body and said suspension member, and a and b denote preselected values.

14. A suspension control system as set forth in claim 13, wherein said damping force modifying command value P is determined according to said relation of $P = Pmin + (Pmax - Pmin)(DY/a + DX/b)$ when a condition of $a \cdot DX + b \cdot DY < a \cdot b$ is satisfied.

15. A suspension control system as set forth in claim 12, wherein said damping force of said minimum level is provided when said vertical speed and said relative displacement speed are smaller than preselected third and fourth threshold values respectively which are smaller than said first and second threshold values respectively during said vibratory motion of said vehicle body and said vertical speed and said relative displacement speed assume said same phase.

16. A suspension control system as set forth in claim 10, wherein said damping force is varied in a stepwise fashion when said vertical speed and said relative displacement speed are smaller than said preselected first and second threshold values respectively during said vibratory motion of said vehicle body and said vertical speed and said relative displacement speed assume said same phase.

17. A suspension control system as set forth in claim 10, wherein said damping force control means provides a damping force modifying command value P to said shock absorber to modify said damping force thereof, said damping force modifying command value P being determined according to a relation of $P = (Pmax - Pmin) \cdot \tan^{-1}\{0.0166(DX^2 + DY^2)^{\frac{1}{2}}\} + Pmin$, wherein Pmax indicates said maximum level, Pmin denotes said minimum level, DX denotes said vertical speed of said vehicle body, and DY denotes said relative displacement speed between said vehicle body and said suspension member, when said vertical speed and said relative displacement speed are smaller than said preselected first and second threshold values respectively during said vibratory motion of said vehicle body and said vertical speed and said relative displacement speed represent said same phase.

* * * * *